(12) United States Patent
Shih

(10) Patent No.: US 7,527,311 B2
(45) Date of Patent: May 5, 2009

(54) ILLUMINABLE PICKER

(76) Inventor: Leo Shih, No. 3 Jingcheng 7$^{th}$ St., Taichung (TW)

( * ) Notice: Subject to any disclaimer, the term of this patent is extended or adjusted under 35 U.S.C. 154(b) by 70 days.

(21) Appl. No.: 11/821,179

(22) Filed: Jun. 22, 2007

(65) Prior Publication Data

US 2008/0315605 A1  Dec. 25, 2008

(51) Int. Cl.
*B25J 1/02* (2006.01)
(52) U.S. Cl. .................... 294/100; 362/120
(58) Field of Classification Search .......... 294/100, 294/19.1, 66.2, 99.2; 362/119, 120
See application file for complete search history.

(56) References Cited

U.S. PATENT DOCUMENTS

| | | | |
|---|---|---|---|
| 2,594,908 A * | 4/1952 | Gaulke et al. ............ 294/86.14 |
| 5,615,920 A * | 4/1997 | O'Kane et al. ............ 294/65.5 |
| 5,647,623 A * | 7/1997 | Shiao ..................... 294/65.5 |
| 5,826,928 A * | 10/1998 | Shang ..................... 294/24 |
| 6,283,607 B1 * | 9/2001 | Lin ........................ 362/119 |
| 6,315,340 B1 * | 11/2001 | Chen ....................... 294/24 |
| 6,478,442 B2 * | 11/2002 | Chen ....................... 362/119 |
| 7,278,751 B2 * | 10/2007 | Chang et al. ............. 362/120 |

* cited by examiner

*Primary Examiner*—Dean J Kramer
(74) *Attorney, Agent, or Firm*—Pro-Techtor Int'l Services

(57) ABSTRACT

An illuminable picker comprises a cylindrical member including cells provided therein, a control member disposed at the rear end of the cylindrical member and including a bolt for fitting a spring thereon, as the bolt is pressed to move, it may contact with the electrode output end of the cells, a sleeve mounted at the front end of the cylindrical member for confining the cells and including a spring fitted thereon and a string fixed at the front end thereof, the string including an expandable claw attached at the front end thereof, a tube secured at the front end of the sleeve for inserting the string and positioning the claw, a bulb affixed on the tube and including anode and cathode output wires, the anode output wire fixed on the tube, while the cathode output wire passing through the sleeve and contacting with the cathode output end of the cells, thereby simultaneously obtaining the picking and illumining purpose.

5 Claims, 11 Drawing Sheets

ILLUMINABLE PICKER

BACKGROUND OF THE INVENTION

1. Field of the Invention

The present invention relates to an illuminable picker that may simultaneously obtain the picking and illumining purpose, thereby obtaining the picking and illumining purpose.

2. Description of the Prior Arts

As shown in FIGS. 1 and 2, a prior art picker comprises a control member 11 including a stem 111 provided at the front end thereof, and the stem 111 including a spring 12 fitted thereon and a flexible string 112 disposed at the front end thereof and inserted into a flexible tube 13 having a disk 131 attached thereon, such that the spring 12 acts against the rear end of the tube 13, the string 112 including an expandable claw 113 affixed at the front end thereof for being further located at the front end of the tube 13. In an non-operating state, the control member 11 is pushed by the spring 12 to actuate the string 112 and the claw 113 to displace rearward, hence the expandable claw 113 is guided and depressed by the end of the tube 13 and retracted at the front end of the tube 13 gradually. As illustrated in FIG. 3, as desiring to pick an object up in a dim and narrow place, the user has to additionally hold a flashlight by one hand and to operate the picker by the other hand, thereby causing an inconvenient operation. For example, the user has to hold the disk 131 of the tube 13 by one hand so as to operate the tube 13 and the string 112 to extend into the narrow place, extending the claw 113 toward the object. Thereafter, by pressing the control member 11 with his finger, the spring 12 is compressed to actuate the string 112 to displace forward in the tube 13; as a result, the string 112 overlies the claw 113 to extend out of the tube 13 and then to expand outward to pick up the object. Referring to FIG. 4, as the claw 113 covers the object, the control member 11 is released to pull the string 112 to move rearward by means of the spring 12, by which the claw 113 is actuated to displace rearward and then is guided and depressed by the end of the tube 13 for being stored inwardly and for securely capturing the object.

However, as desiring to pick an object up in a dim and narrow place, the user has to additionally hold a flashlight by one hand and to operate the picker by the other hand, thereby causing an inconvenient operation.

The present invention has arisen to mitigate and/or obviate the afore-described disadvantages.

SUMMARY OF THE INVENTION

The primary object of the present invention is to provide an illuminable picker that may utilize a bulb to light the object and then pick it up by way of a claw.

In accordance with one aspect of the present invention, there is provided an illuminable picker comprising a cylindrical member including cells provided therein, a control member disposed at the rear end of the cylindrical member and including a bolt for fitting a spring thereon, as the bolt is pressed to move, it may contact with the electrode output end of the cells, a sleeve mounted at the front end of the cylindrical member for confining the cells and including a spring fitted thereon and a string fixed at the front end thereof, the string including an expandable claw attached at the front end thereof, a tube secured at the front end of the sleeve for inserting the string and positioning the claw, a bulb affixed on the tube and including anode and cathode output wires, the anode output wire fixed on the tube, while the cathode output wire passing through the sleeve and contacting with the cathode output end of the cells.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
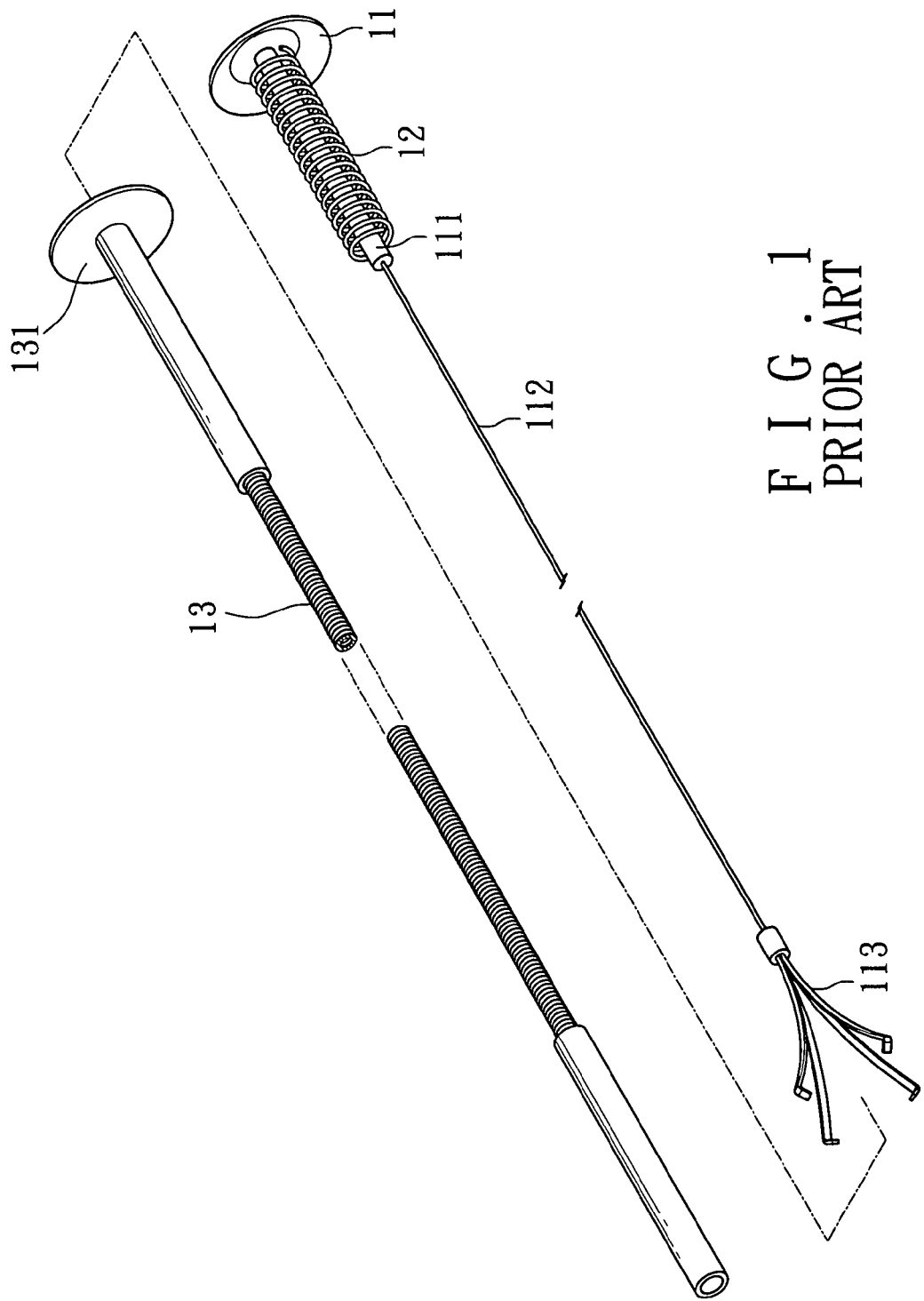
FIG. 1 is a perspective diagram illustrating the exploded components of a prior art picker.
Figure 2:
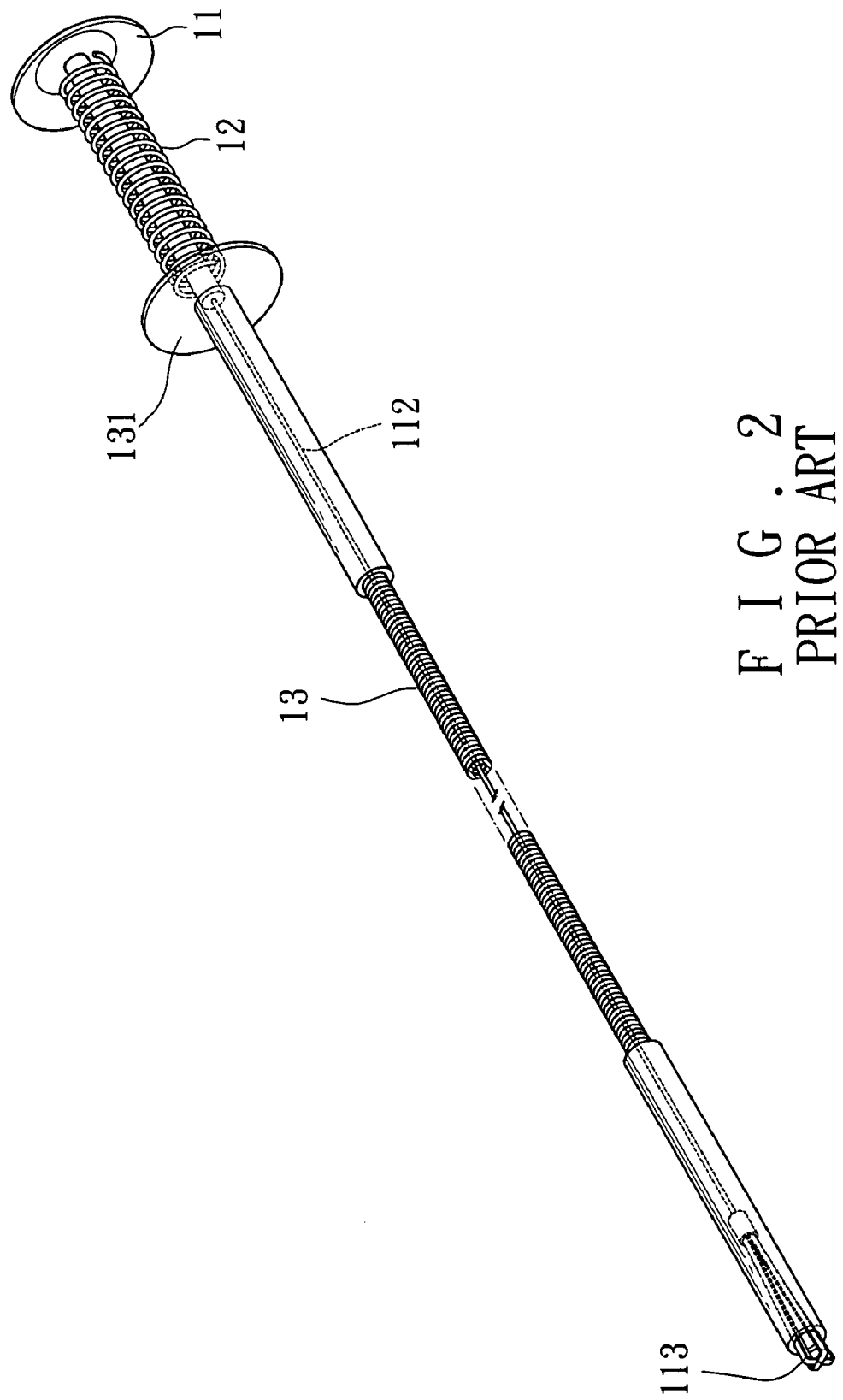
FIG. 2 is a perspective diagram illustrating the assembly of the prior art picker.
Figure 3:
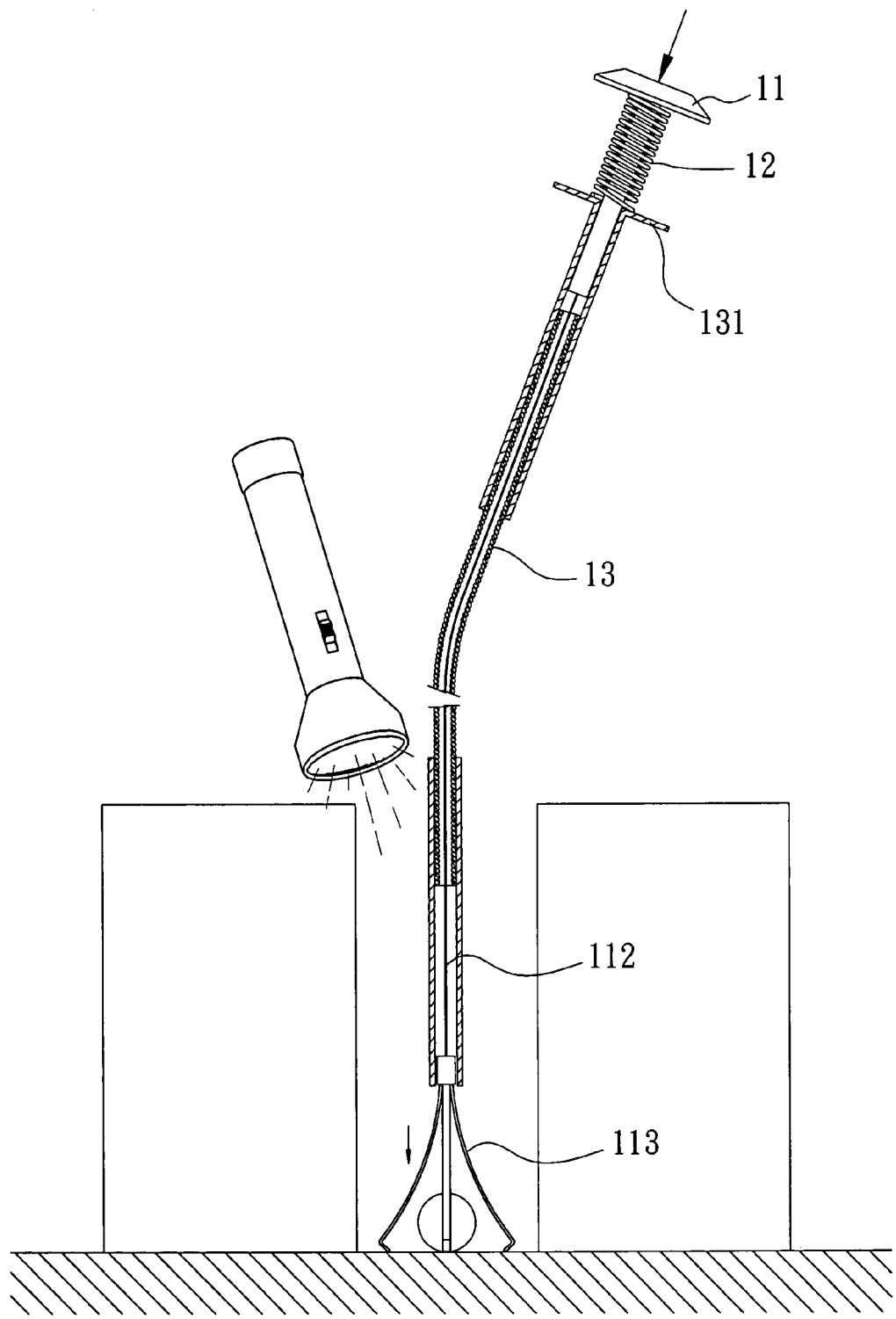
FIG. 3 is an operational diagram of the prior art picker.
Figure 4:
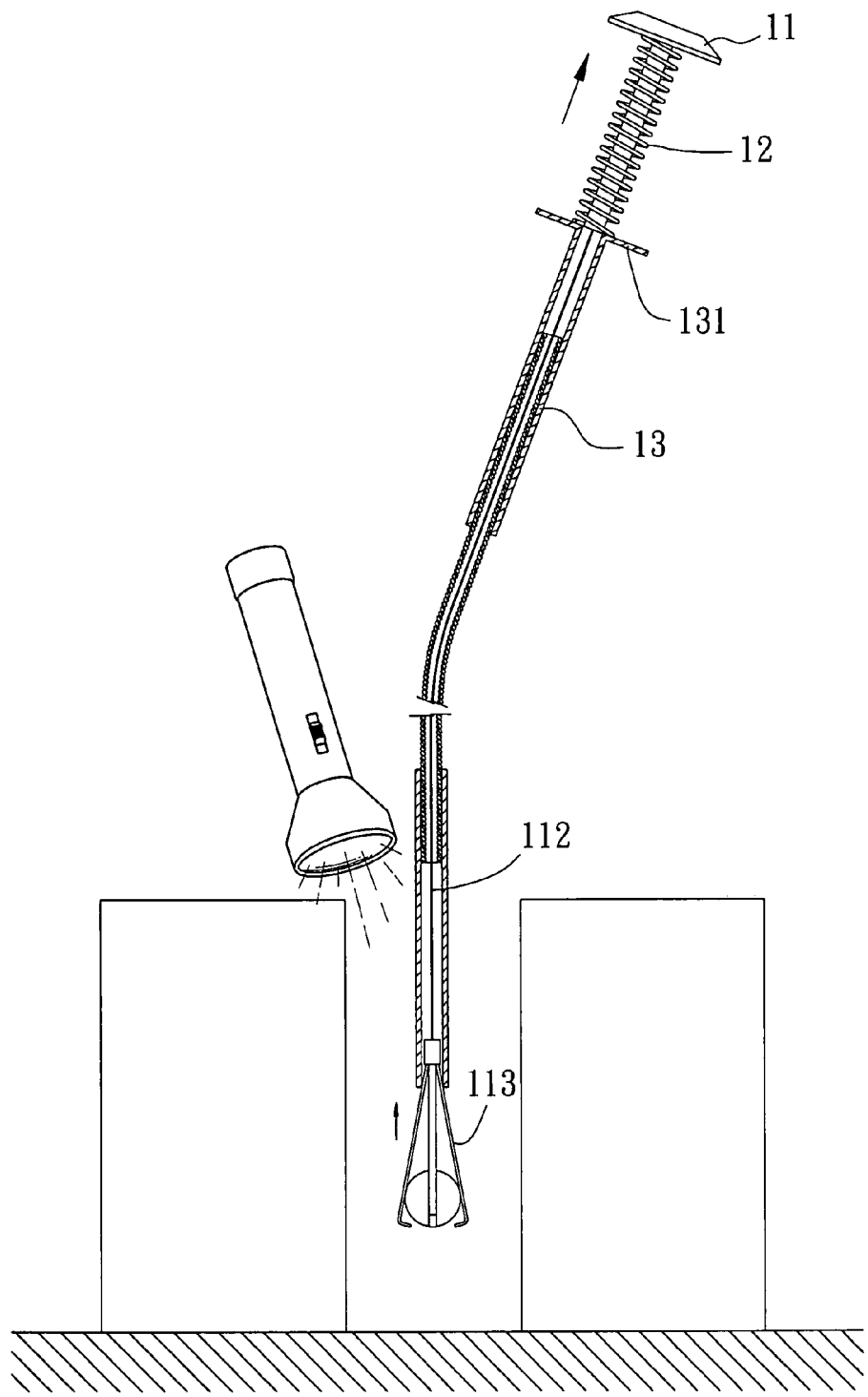
FIG. 4 is another operational diagram of the prior art picker.
Figure 5:
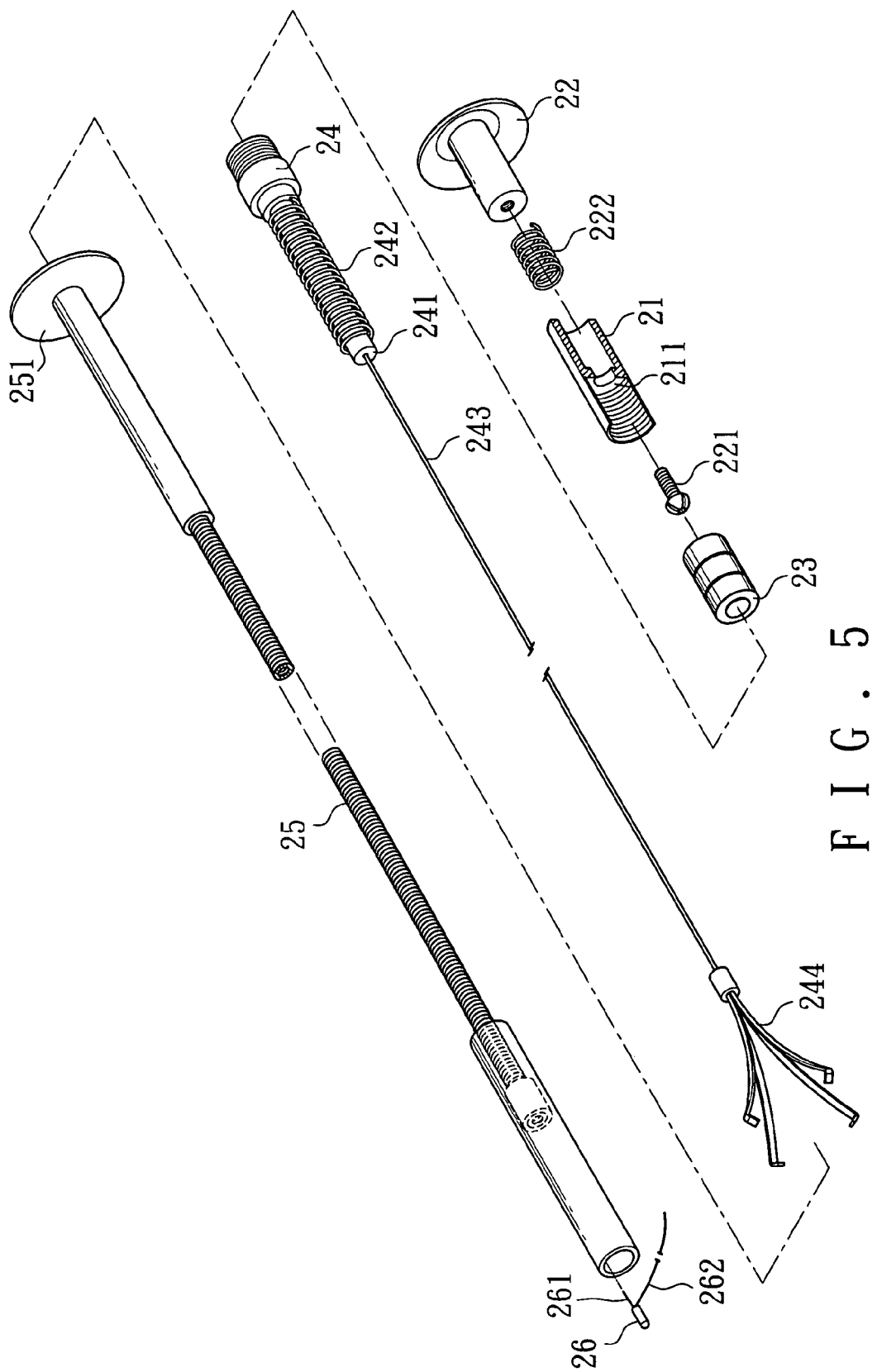
FIG. 5 is a perspective diagram illustrating the exploded components of an illuminable picker of the present invention.
Figure 6:
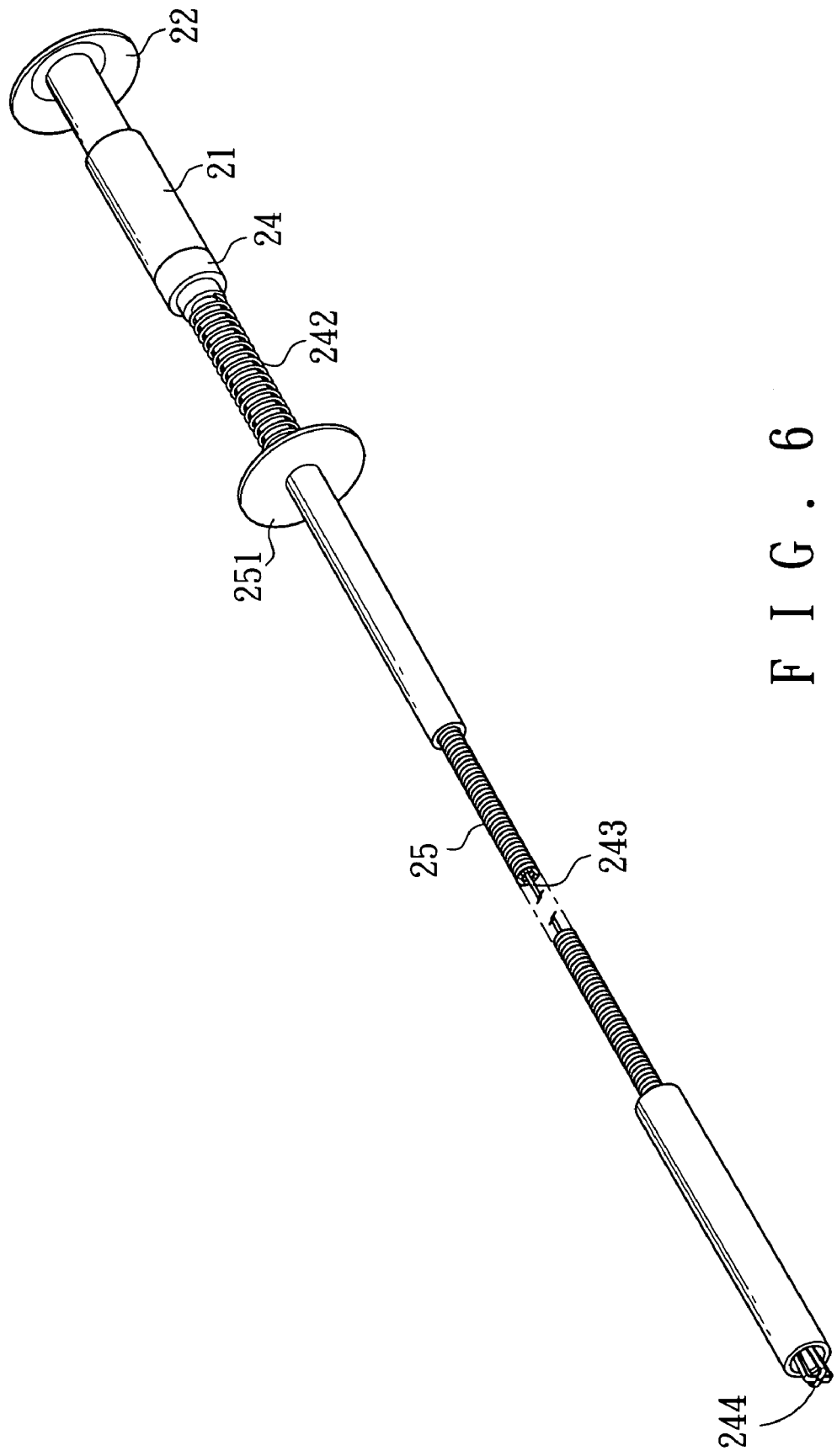
FIG. 6 is a perspective diagram illustrating the exploded components of the illuminable picker of the present invention.
Figure 7:
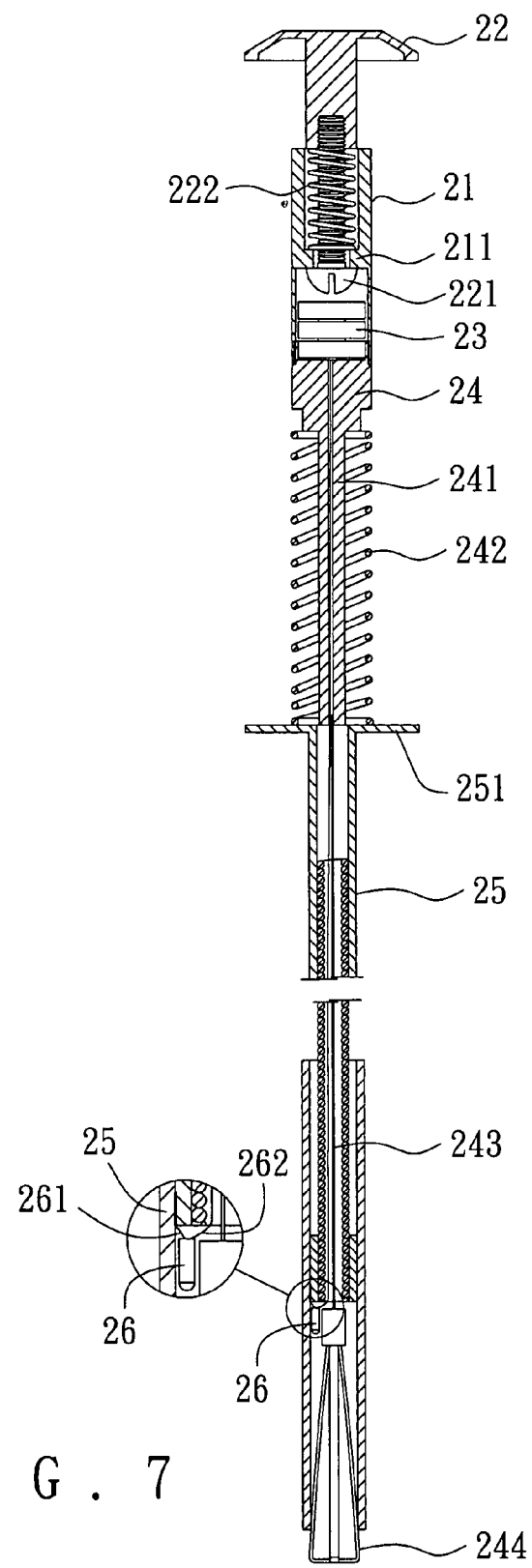
FIG. 7 is a cross sectional diagram illustrating the assembly of the illuminable picker of the present invention.

Referring to FIGS. 5-7, an illuminable picker in accordance with the present invention comprises a cylindrical member 21 including a shoulder portion 211 formed therein, having a central bore arranged therein and having a control member 22 received in the rear side thereof. The control member 22 includes a bolt 221 for electric conduction passing through the central bore of the shoulder portion 211 and includes a first spring 222 fitted thereon. Since the head portion of the bolt 221 is located at the front side of the shoulder portion 211, the control member 22 may utilize the spring 222 to urge the bolt 221 to displace rearward, such that the head portion of the bolt 221 is biased against the shoulder portion 211, and at the front side of the shoulder portion 211 is provided with a plurality of cells 23 having an anode output end which doesn't contact with.the bolt 221, the cylindrical member 21 involves a sleeve 24 screwed at the front end thereof so as to confine the cells 23 and having a stem 241 disposed at the front end thereof for fitting a second spring 242 thereon, and having a flexible member 243 mounted at the front end thereof. The member 243 is inserted into a tube 25 so that the Second spring 242 contacts the rear end of the tube 25, and includes an expandable claw 244 secured at the end portion thereof for locating at the front end of the tube 25. in one embodiment, the flexible member 243 is a flexible string. The sleeve 24 may apply the second spring 242 to actuate the member 243 and the claw 244 to move rearward, and the claw 244 is depressed by the end of the tube 25 for moving inward to be stored in the front end of the tube 25. Moreover, the tube 25 includes a bulb 26 provided therein, an anode output wire 261 of which is fixed on the inner wall of the tube 25, while a cathode output wire 262 of which passes through the tube 25 and the sleeve 24 and then contacts with the cathode output end of the cells 23. Due to the bolt 221 does not contact with the anode output end of the cells 23, the bulb 26 is not be electrically conducted.

Figure 8:
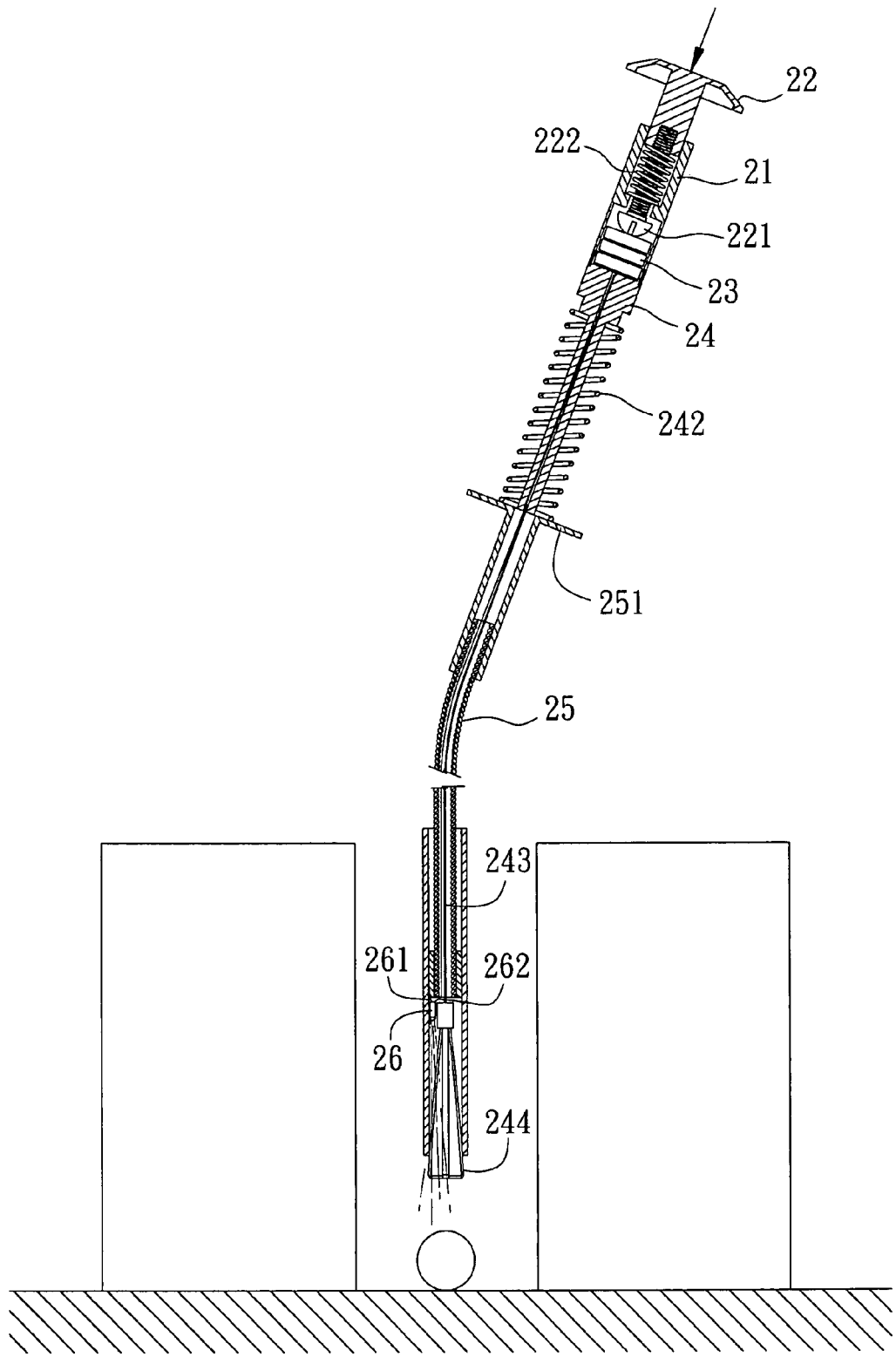
FIG. 8 is a cross sectional diagram illustrating a bulb of the picker of the present invention being activated.

As shown in FIG 8, if desiring to pick object in a dusky and narrow place, the user may hold a disk 251 by hand to place the tube 25 and the member 243 into the place, such that the claw 244 extends into the place for picking object, and then by using his finger to press the control member 22, the bolt 221 is actuated to displace forward, hence the head portion of the bolt 221 contacts the anode output end of the cells 23. Furthermore, because the cathode output end of the cells 23 contacts with the cathode output wire 262 of the bulb 26,and the anode output wire 261 thereof is attached onto the tube 25, and through the conduction of the metallic tube 25, the second spring 242, the sleeve 24 and the cylindrical member 21, and through the contact of the bolt 221 and the anode output end of the cells 23, a conductive circuit occurs, thereby during pressing the control member 22, the bolt 221 may be electrically 20 conducted to activate the bulb 26 for illumining object.

Figure 9:
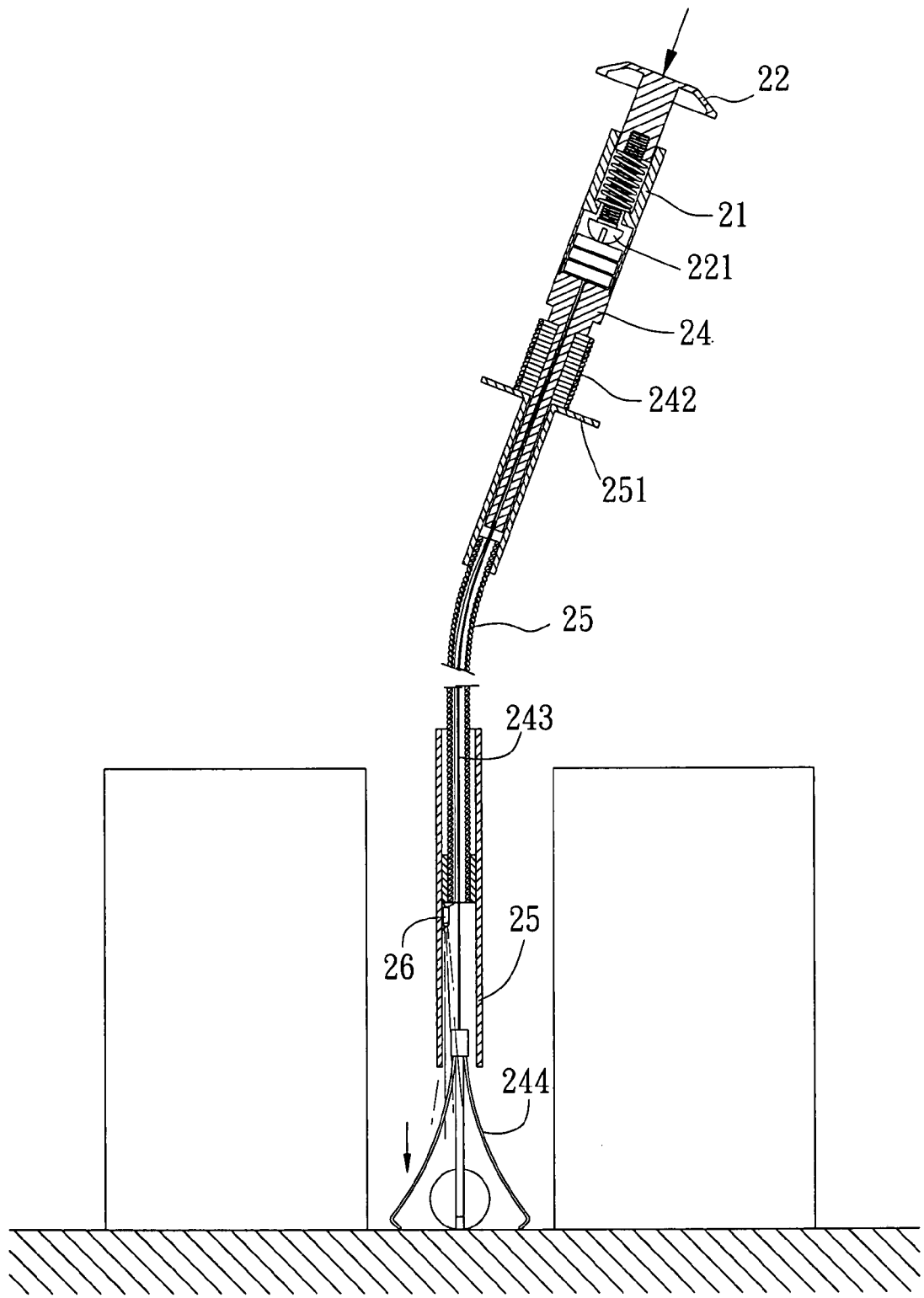
FIG. 9 is a cross sectional diagram illustrating a claw of the picker of the present invention being about to pick the object up.

With reference to FIG. 9, as the user further presses the control member 22, it actuates the cylindrical member 21 and the sleeves 24 to displace forward, the sleeve 24 compresses the second spring 242 to actuate the string 243 and the claw 244 to move forward, such that the claw 244 extends out of the tube 25 and is about to pick object.

Figure 10:
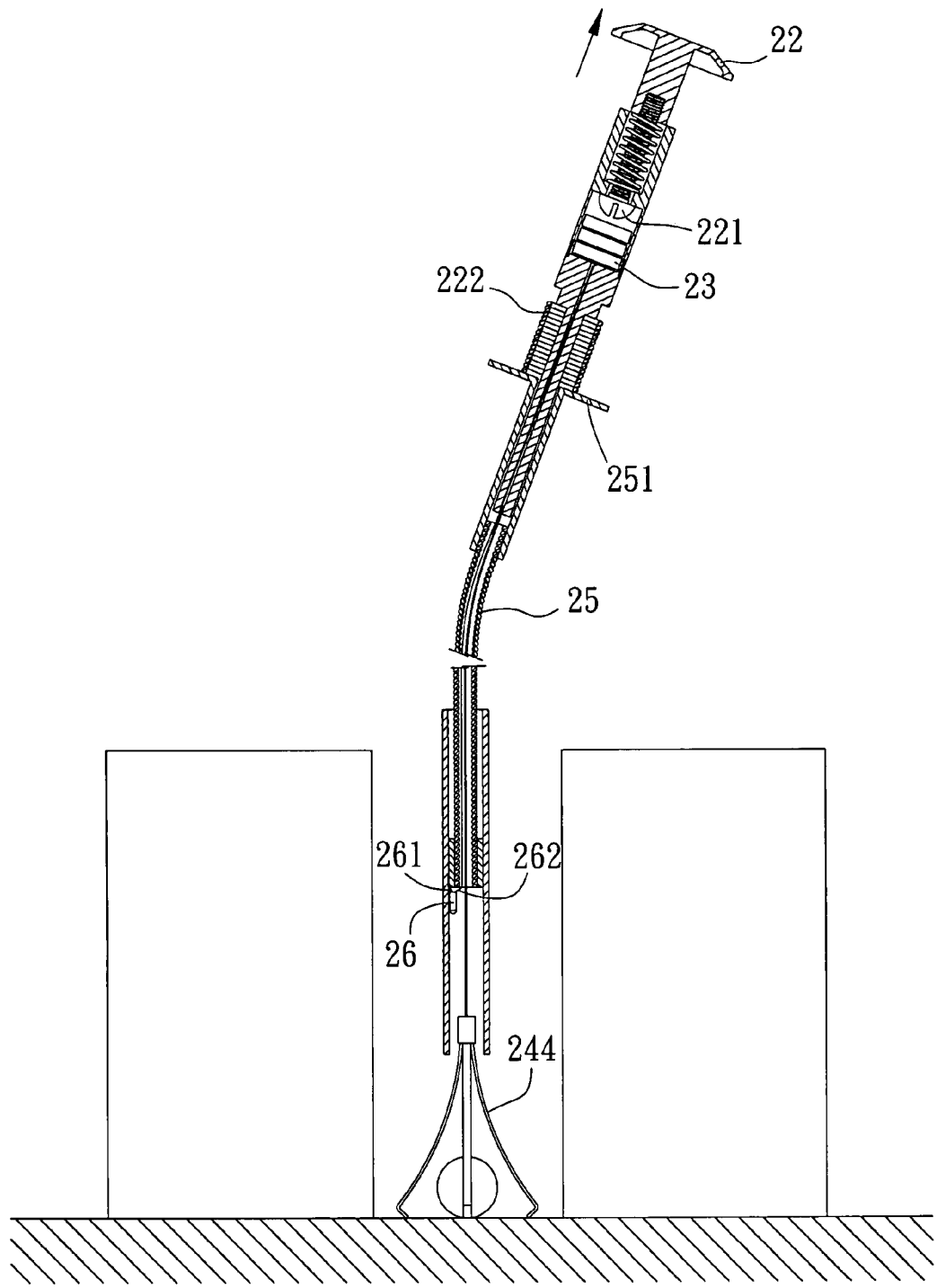
FIG. 10 is a cross sectional diagram illustrating the bulb of the picker of the present invention being deactivated.

As illustrated in FIG 10, after the claw 244 precisely puts onto the object, the control member 22 is released to actuate the bolt 221 to displace rearward by way of the first spring 222, such that the bolt 221 removes from the anode output end of the cells 23, thus deactivating the bulb 26.

Figure 11:
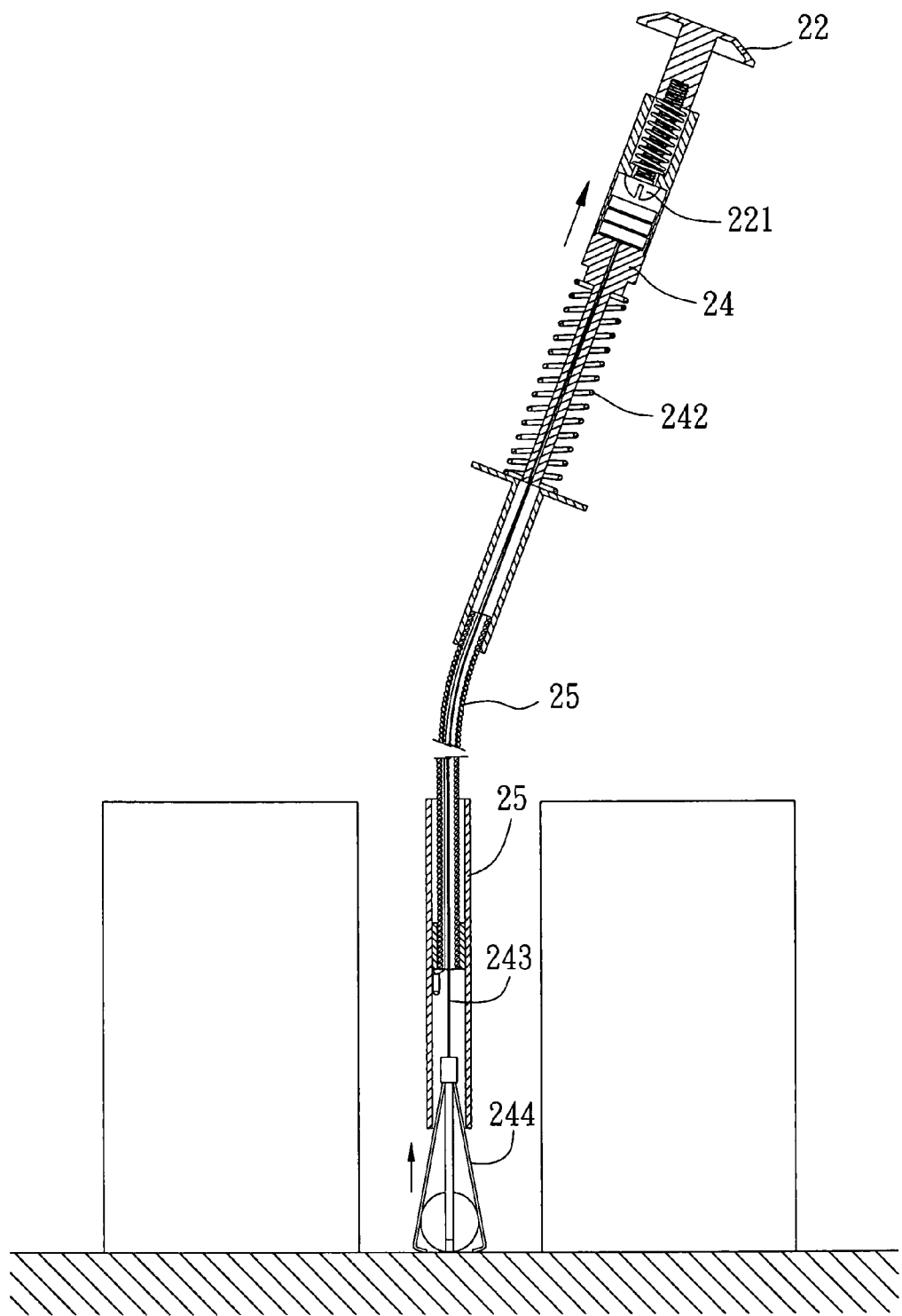
FIG. 11 is a cross sectional diagram illustrating the claw of the picker of the present invention picking the object up.

Referring to FIG 11, as the sleeve 24 is not depressed any more, the second spring 242 actuates the member 243 and the claw 244 to displace rearward, and the claw 244 is guided and acted against by the front end of the tube 25 to be stored therein, thus securely capturing object.

The invention is not limited to the above embodiment but various modifications thereof may be made. It will be understood by those skilled in the art that various changes in form and detail may made without departing from the scope and spirit of the present invention.

What is claimed is:

1. An illuminable picker comprising: a cylindrical member including cells provided therein; a control member disposed at the rear end of said cylindrical member and including an electricity conducting member for fitting a spring thereon received therein, said electricity conducting member is moveable when pressed to make contact with the electrode output end of said cells;

a sleeve mounted at the front end of said cylindrical member for confining said cells and including a second spring fitted thereon and a flexible member fixed at the front end thereof, said member including an expandable claw attached at the front end thereof;

a tube secured at the front end of said sleeve for inserting said flexible member therein and for positioning said claw at the front end thereof;

a bulb affixed on said tube and including anode and cathode output wires, said anode output wire fixed on said tube, while said cathode output wire passing through said sleeve and then contacting with a cathode output end of said cells;

wherein said cylindrical member includes a shoulder portion formed therein, having a central bore arranged therein, having said cells received in the front end thereof and having said control member received in the rear side thereof;

wherein said electricity conducting member is a bolt inserted into said bore of said shoulder portion interior of said first spring and threadedly attached with said control member, whereby the head portion of said bolt is located at the front end of said shoulder portion.

2. The illuminable picker as claimed in claim 1, wherein said sleeve screwed at the front end of said cylindrical member and has a stem disposed at the front end thereof for fitting said second spring thereon and further has a flexible member mounted at the front end thereof.

3. The illuminable picker as claimed in claim 2, wherein said flexible member is a flexible string.

4. The illuminable picker as claimed in claim 1, wherein said tube is a flexible tubular member.

5. The illuminable picker as claimed in claim 1, wherein at the rear end of said tube is provided with a disk.

* * * * *